United States Patent
Kawamura

Patent Number: 6,098,734
Date of Patent: Aug. 8, 2000

[54] HYBRID POWERED AUTOMOBILE WITH CONTROLLER

[75] Inventor: Hideo Kawamura, Kanagawa-ken, Japan

[73] Assignee: Isuzu Ceramics Research Institute Co., Ltd., Kanagawa-ken, Japan

[21] Appl. No.: 08/864,376

[22] Filed: May 28, 1997

[30] Foreign Application Priority Data

Jun. 6, 1996 [JP] Japan ................................. 8-165109

[51] Int. Cl.$^7$ ............................................... B60K 1/00
[52] U.S. Cl. .................... 180/65.2; 180/65.4; 701/22; 340/464; 307/112
[58] Field of Search ................................. 180/65.3, 65.2, 180/65.4, 65.5, 65.8; 701/22; 340/988, 995, 425.5, 464; 307/112, 128, 115, 116

[56] References Cited

U.S. PATENT DOCUMENTS

| | | | |
|---|---|---|---|
| 4,199,037 | 4/1980 | White ....................................... | 180/65.3 |
| 5,212,431 | 5/1993 | Origuchi et al. ........................... | 318/139 |
| 5,285,862 | 2/1994 | Furutani et al. . | |
| 5,318,142 | 6/1994 | Bates et al. . | |
| 5,323,868 | 6/1994 | Kawashima ............................. | 180/65.4 |
| 5,327,992 | 7/1994 | Boll ......................................... | 180/65.2 |
| 5,345,154 | 9/1994 | King . | |
| 5,471,384 | 11/1995 | Nakashima et al. ....................... | 701/22 |
| 5,495,906 | 3/1996 | Furutani .................................. | 180/65.2 |
| 5,664,635 | 9/1997 | Koga et al. ............................... | 180/65.3 |
| 5,762,156 | 6/1998 | Bates et al. ............................... | 180/65.4 |
| 5,778,997 | 7/1998 | Setaka et al. ............................. | 180/65.2 |
| 5,788,003 | 8/1998 | Spiers ...................................... | 180/65.2 |
| 5,815,824 | 9/1998 | Saga et al. ................................ | 701/22 |
| 5,865,263 | 2/1999 | Yamaguchi et al. ...................... | 180/65.2 |
| 5,915,489 | 6/1999 | Yamaguchi .............................. | 180/65.2 |

FOREIGN PATENT DOCUMENTS

| | | |
|---|---|---|
| 0394481 | 10/1990 | European Pat. Off. . |
| 0570234 | 11/1993 | European Pat. Off. . |
| 3-270603 | 12/1991 | Japan . |
| 7-023504 | 1/1995 | Japan . |
| 7-317581 | 12/1995 | Japan . |

OTHER PUBLICATIONS

Moroto Shuzo et al., Patent Abstracts of Japan, JP 07 107617, vol . 095, No. 007, Apr. 21, 1995.

Patent Abstracts of Japan, JP 03 270603, vol. 016, No. 018, Dec. 2, 1991.

Suzuki Shogo, Patent Abstracts of Japan, JP 04 050427, vol. 016, No. 239, Feb. 19, 1992.

Moroto Shuzo et al., Patent Abstracts of Japan, JP 07 023504, vol. 095, No. 004, Jan. 24, 1995.

Minesawa Yukihiro et al., Patent Abstracts of Japan, JP 63 188529, vol. 012, No. 464, Aug. 4, 1988.

Nanun Shinichi et al., Patent Abstracts of Japan, JP 59 027194, vol. 008, No. 124, Feb. 13, 1984.

*Primary Examiner*—J. J. Swann
*Assistant Examiner*—Lynda Jasmin
*Attorney, Agent, or Firm*—Browdy and Neimark

[57] ABSTRACT

This hybrid powered automobile has generators driven by the engine and a battery, and also includes a controller that selects the motive power in compliance with regulations on noise and NOx. The controller of the hybrid powered automobile selects whether the vehicle is to be driven by the electricity of the generators driven by the engine or by the electricity of the battery. When the battery charge level is lower than a specified level, the engine is operated in a range where the engine produces a minimum amount of NOx and the mileage does not deteriorate. When the vehicle is traveling in areas where release of exhaust emissions is permitted, the engine is operated to generate electricity to recharge the battery. The control of switching the motive power between the engine and the battery is performed by receiving a signal transmitted from a traffic light equipment elected on the road.

8 Claims, 1 Drawing Sheet

HYBRID POWERED AUTOMOBILE WITH CONTROLLER

BACKGROUND OF THE INVENTION

1. Field of the Invention

The present invention relates to a hybrid powered automobile having a controller that performs a selective drive control using a generator which generates electricity by an engine driving force or battery.

2. Description of the Prior Art

Electric cars have been known that are powered by batteries on board. The electric cars use electricity stored in the battery as a motive power and do not produce exhaust emissions as do the diesel and gasoline engines that use light oil and gasoline as fuel, and thus have found uses in areas where release of emissions is not wanted, such as urban areas. Battery-powered electric cars, however, have drawbacks that it takes many hours to recharge the battery and that they can only travel a distance corresponding to the battery capacity and cannot run a long distance at a stretch.

Under these circumstances, hybrid cars with an engine and a battery aboard are attracting attention in recent years. The engine on board the hybrid powered automobile operates on gasoline, light oil, alcohol or natural gas as fuel to drive a generator to charge the on-board battery with electric energy, which is used for driving the vehicle. Such hybrid powered automobiles are disclosed, for example, in Japanese Patent Laid-Open No. 270603/1991, 317581/1995 and 23504/1995.

The hybrid powered automobiles disclosed in these publications drive the generator by the engine and use electric power produced by the generator to drive the drive shafts.

In the electric car disclosed in the Japanese Patent Laid-Open No. 270603/1991, the drive wheels are driven by a motor powered by a storage battery, which is connected through a charger to the generator coupled to a generator-driving engine. The charger is designed to be chargeable also from an external power source. Further, in this electric car, the engine is operated at all times in an optimum condition considering the production of exhaust emissions and mileage, and the vehicle is driven by the electricity stored in the battery regardless of variations in drive wheel revolutions, running speed and load. This car is not designed to run only on the battery with the engine at rest. Because the engine is driven at all times, this electric car does not abate the production of NOx in exhaust emissions.

The hybrid electric car disclosed in the Japanese Patent Laid-Open No. 317581/1995 generates by a generator as much electric power as is required by the drive motor to reduce the frequency of battery recharge and discharge and thereby prevent possible efficiency degradation due to recharge and discharge. A motor demand output means determines the amount of electricity required by the drive motor and a calculation means calculates the amount of power to be generated according to the demand power of the motor. When the motor demand power is low, the engine load is also low and a control is performed whereby only a part of the cylinders is operated to reduce throttle losses. Based on the calculated amount of generation, the calculation means determines the engine revolution speed and an operation range decision means checks whether the engine revolution speed is within the range of the current operation mode. If the revolution speed is outside the operation range, a mode change means changes the number of cylinders to be operated.

Further, this hybrid electric car, like the above electric car, has the engine operating at all times while the car is running, in order to generate as much electricity as is consumed by the motor.

In the hybrid car disclosed in the Japanese Patent Laid-Open No. 23504/1995, the power supply circuit is designed to drive the engine near the highest efficiency point to reduce exhaust emissions and prevent battery deterioration. A control section detects the vehicle resting state from a car speed signal and a shift position signal supplied from the sensor section. When the battery charge level is lower than a specified level, the engine is driven near the highest efficiency point to generate electricity by the generator and recharge a capacitor to a specified level. With the capacitor recharged to the specified capacitance, the control section stops the engine and turns on a connection switch to recharge the battery from the capacitor. After the recharge is complete, the switch is returned to the original state.

Further, the power supply circuit of the above hybrid car drives the engine near the highest efficiency point when the charge level of the battery is lower than the specified level and, when it is higher than the specified level, stops the engine. The car is driven by the power of the battery.

In the hybrid powered automobile, which operates an on-board engine using gasoline, light oil, alcohol or natural gas as fuel and at the same time runs on electric energy of an on-board battery, it may be considered desirable if the car is designed to run on the electric energy of the battery in areas where release of exhaust emissions from the engine is not preferred, such as tunnels or urban areas, and in other areas, run on the engine. In that case, the hybrid powered automobile needs to choose between the engine and the battery as a motive power and how the switching timing and switching range should be determined is a critical question. As described above, the hybrid car has yet to determine the timing of switching between the engine and the battery as the motive power.

SUMMARY OF THE INVENTION

Under these circumstances, it is an object of this invention to provide a hybrid powered automobile, in which selection is made of whether the vehicle is to be driven by electricity of the generators driven by the engine or by electricity of the battery without operating the engine; in which when the battery charge level is lower than a specified level, the engine is operated in a range where the engine produces the least amount of NOx and the mileage does not deteriorate; in which when the vehicle is running in areas where release of exhaust emissions is permitted, the engine is operated to generate electricity to recharge the battery; in which the control of switching the motive power between the engine and the battery is performed according to signals received from traffic light equipment on road or satellites that incorporate a means to transmit short waves and millimeter waves representing the switching instructions; and in which when the vehicle is braked, the braking force is regenerated into electricity and stored.

This invention relates to a hybrid powered automobile comprising: an engine mounted on a vehicle traveling on a road; drive shafts to rotate drive wheels of the vehicle; motors to transmit driving force to the drive shafts; generators to generate electricity by the rotation of an output shaft of the engine; a capacitor parallelly connected to connecting lines connecting the generators and the motors; a battery parallelly connected to the connecting lines; an inverter to transform DC power from the generator or the battery into AC power for the motors; a converter to convert an output current to a DC current; and a controller to perform a control of selecting either the battery or the generators as a motive power to drive the drive shafts.

The controller performs a control of selecting the battery or the generators as the motive power in response to a signal from a detecting means that receives a signal representing the running condition of the vehicle. The detecting means receives a signal transmitted by a traffic light equipment erected on the road and treats it as a vehicle running condition signal.

The controller performs a control of driving the drive shafts by the battery or the generators according to the charged state of the battery or the capacitor.

The battery is recharged with electricity generated by the generator or with electricity of an external power source.

When the engine is operated, the controller can perform a control of operating the engine in an operation range where the engine produces the least amount of NOx in exhaust emissions from the engine.

When the vehicle is braked, the controller performs a control of making the motors act as generators and recharging the capacitor and the battery with the electricity generated by the generators.

Because the hybrid powered automobile is constructed as described above, the vehicle can be driven, according to the instructions from the controller, either by the electricity of the generators driven by the engine or by the electricity of the on-board battery without operating the engine.

In this hybrid powered automobile, the switching device for selecting the engine or the battery as the motive power can be automatically controlled by the controller according to the signals from the traffic light equipment on the road or from the satellites, or according to whether the vehicle is running up a sloped road, or according to the charge level of the battery. When the vehicle is traveling on an uphill road or when the battery charge is not sufficient, the engine can be operated to generate a driving force of the vehicle. In that case, the controller controls the operation of the engine in a range where the amount of NOx in exhaust emissions produced by the engine is minimal.

Because of the above configuration, when it travels in urban and residential areas with strict regulations on noise and emissions or areas of heavy traffic where NOx emissions are required to be reduced during summer, the hybrid powered automobile can run on the car-mounted battery without operating the engine. When it is running on an uphill road or the battery charge is not sufficient, the engine can be operated. In that case, the controller controls the operation of the engine in a range where the engine will produce the least amount of NOx in the exhaust emissions.

DETAILED DESCRIPTION OF THE EMBODIMENT

Figure 1:
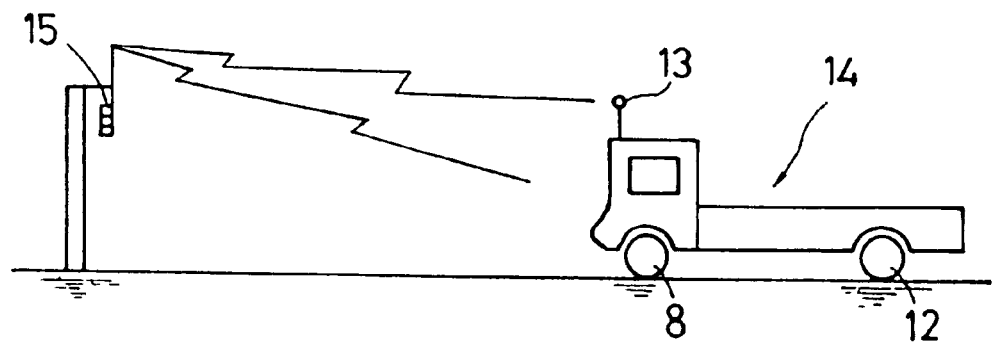
FIG. 1 is a schematic view of one example showing the hybrid powered automobile of this invention receiving an instruction from a traffic light when traveling on a road.
Figure 2:
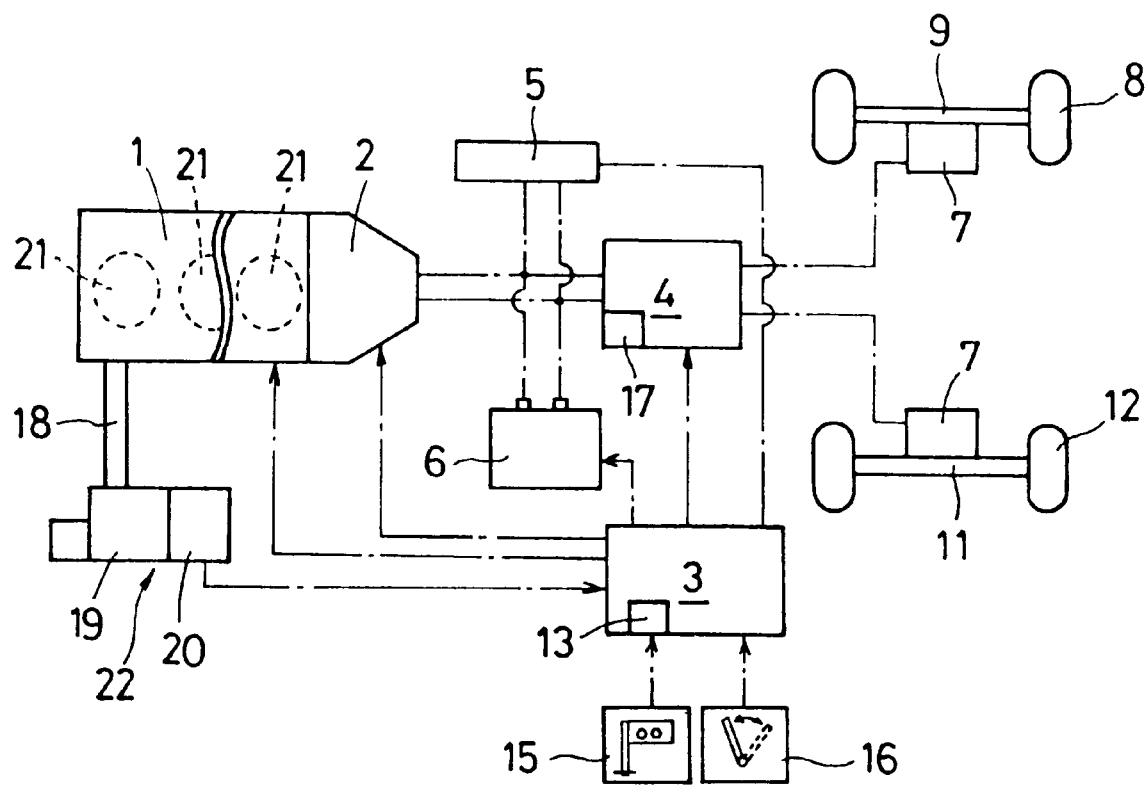
FIG. 2 is an explanatory diagram showing one embodiment of the hybrid powered automobile of this invention.

Now by referring to the accompanying drawings, the hybrid powered automobile with a controller as one embodiment of this invention will be described.

This hybrid powered automobile of this embodiment is a vehicle that runs on an engine 1 or a battery 6. In the hybrid powered automobile of this embodiment, a generator 2 is mounted on an output shaft (not shown) of the engine 1, a motor 7 is connected to a front wheel drive shaft 9 mounted with front wheels 8 of the vehicle 14 and another motor 7 is connected to a rear wheel drive shaft 11 mounted with rear wheels 12.

In this embodiment, the front wheels 8 and the rear wheels 12 of the vehicle 14 are shown to be drive wheels. It is also possible to set either the front wheels 8 or the rear wheels 12 as the drive wheels. Electric energy produced by the generator 2 is supplied through an inverter 4 to the motor 7 of the front wheel drive shaft 9 and to the motor 7 of the rear wheel drive shaft 11 to drive the vehicle 14.

The inverter 4 transforms DC power from the generator 2 or battery 6 into AC power for the motors 7. The inverter 4 has a converter 17 that converts the output current into DC current. Between the generator 2 and the inverter 4 are provided a capacitor 5 and the battery 6 that are connected in parallel with the inverter 4.

When brake is applied to the front wheels 8 and the rear wheels 12 of the vehicle 14, the motor 7 of the front wheel drive shaft 9 and the motor 7 of the rear wheel drive shaft 11 can be made to act as generators to recharge the capacitor 5 with the generated current and regenerate it. The battery 6 can be recharged not only by the generator 2 but also by an external power supply outside the vehicle.

In the above configuration, this hybrid powered automobile operates the engine 1 to generate electricity by the generator 2 to drive the vehicle 14, or uses the electricity from the battery 6 to drive the vehicle 14 without operating the engine 1, or operates the engine 1 to generate electricity by the generator 2 to recharge the battery 6 and at the same time consume the power of the battery 6 for driving the vehicle.

The control of selecting between the engine 1 and the battery 6 is performed by an electronic control device, i.e., a controller 3. In response to signals received by a sensor 13—a receiving means or receives that receives the running condition signals of the vehicle 14—the controller 3 selects between the battery 6 and the generator 2 as a motive power.

The sensor 13 receives a signal from a traffic light equipment 15 erected on a road and uses it as the running condition signal for the vehicle 14.

In an operation mode where the engine 1 is operated to recharge the battery 6 while at the same time consuming the power of the battery 6 to drive the vehicle, because the power of the battery 6 is consumed even when variations occur in the vehicle speed and load, the controller of this hybrid powered automobile does not need to change the operating condition of the engine 1. This means that the engine 1 can be operated in an optimum condition, such as in an operation range that generates a low level of NOx or in an operation range that ensures a good mileage.

In this hybrid powered automobile, because the electric current generated by the engine 1 is transformed into DC or smoothed current and then supplied through the inverter 4 to the motors 7 of the front wheel drive shaft 9 and the rear wheel drive shaft 11 to drive these motors, the efficiency can be improved. As explained above, the engine 1 can be operated only where it can generate a required amount of power at high efficiency, which leads to improved mileage. In the hybrid powered automobile, as long as the engine 1, while it is operated in a high mileage range, can supply the required amount of power to the battery 6 for recharge, the battery recharging does not deteriorate the mileage.

When it travels in urban areas and residential areas where strict regulations on noise and emissions are enforced or during the summer season when NOx production is required by regulations to be controlled, this hybrid powered automobile can be controlled by the controller 3 so that it runs on the battery 6 to meet these regulations.

In other areas with no such traffic regulations on noise or emissions of the vehicles 14, the hybrid powered automobile operates the engine 1 to drive the generator 2 to either drive the vehicle 14 with the generated electricity or to recharge the battery 6 and capacitor 5 with the electricity.

The hybrid powered automobile therefore requires a switching means to select between the operation modes and a means to issue an instruction to the switching means. In areas where noise, NOx emissions and smokes are required to be controlled, the traffic light equipment 15 on the road is provided with a means that transmits short waves or millimeter waves—the means to issue instructions to the switching means. Upon receiving the short waves or millimeter waves, the controller 3 activates the switching means to select an appropriate operation mode. Alternatively the means to issue instructions to the switching means may be formed as follows. The controller 3, as in the car navigation, locates the present position of the vehicle according to signals from satellites, checks a prepared map to see whether the present location is in the emissions- or noise-controlled areas, and based on the requirements of regulations controls the switching means.

When the vehicle 14 is running on an uphill road or when the battery 6 is not fully charged, i.e., charged to less than the predetermined level, the hybrid powered automobile requires the driving force of the engine 1. In that case, the controller 3 selects, according to the running conditions, the operation range where the engine 1 produces the least amount of NOx and smoke.

In this hybrid powered automobile, whether the vehicle 14 should be driven either by using the electricity of the generator 2 driven by the engine 1, or by using the electricity of only the battery 6, or by using the electricity of the battery 6 while at the same time operating the engine 1 can be selected by the driver operating a manual switching means 16 such as a manual button or lever.

The hybrid powered automobile should preferably use a heat insulating engine with its combustion chambers 21 specially constructed for heat insulation. The heat insulation structure of the combustion chambers 21 may comprise a heat resisting member made of, for example, ceramics and a heat insulating layer such as an air layer on the outer side of the heat resisting member. Emissions from the combustion chambers 21 are exhausted through exhaust passage 18. The exhaust passages 18 may comprise a heat resisting member made of, for example, ceramics and a heat insulating layer made of, for example, a heat insulating member on the outer side of the heat resisting member. In the exhaust passages 18 is installed an energy recovery turbine 22 that recovers the energy of the exhaust gas released from the combustion chambers 21. The energy recovery turbine 22 comprises a turbine 19 driven by the exhaust gas flowing through the exhaust passage 18 and a generator 20 having a permanent magnet mounted on the shaft of the turbine 19. The electricity generated by the generator 20 is used as the motive power for the hybrid powered automobile according to the instructions of the controller 3.

What is claimed is:

1. A hybrid powered automobile comprising:

an engine mounted in the automobile, drive shafts to rotate drive wheels of the automobile, a motor to transmit driving force to the drive shafts, a generator to generate electricity by a rotation of an output shaft of the engine, a capacitor connected in parallel to a connecting line coupling the generator and the motor, a battery connected in parallel to the connecting line, an inverter to transform DC power from the generator or the battery into AC power for the motor, a converter to convert an output current from the generator to a DC current, and a controller for selecting any one of the battery and the generator as a motive power to drive the drive shafts, a receiver, coupled to the controller, to receive an instruction signal from a location external of the vehicle for instructing the controller to select the battery or the generator as the motive power according to the instruction signal, wherein the instruction signal represents a running condition of the automobile.

2. A hybrid powered automobile according to claim 1, wherein the instruction signal is emitted by traffic equipment adjacent a road and the controller outputs a vehicle running condition signal, which is a function of the instruction signal.

3. A hybrid powered automobile according to claim 1, wherein the controller controls driving of the drive shafts by the battery and the generator according to the charged state of any one of the battery and the capacitor.

4. A hybrid powered automobile according to claim 1, wherein the battery is recharged with any one of electricity generated by the generator and electricity from an external power source.

5. A hybrid powered automobile according to claim 1, wherein when the engine is operated, the controller performs a control of operating the engine in an operation range where the engine produces a least amount of NOx in exhaust emissions from the engine.

6. A hybrid powered automobile according to claim 1, wherein when the vehicle is braked, the controller performs a control of making the motors act as generators and recharging the capacitor and the battery with the electricity generated by the generator.

7. A hybrid powered automobile according to claim 1, wherein an energy recovery turbine is installed in exhaust passages through which the exhaust gases from the combustion chambers flow, the energy recovery turbine comprises a turbine driven by the exhaust gases flowing through the exhaust passages and another generator having a permanent magnet mounted on a shaft of the turbine, and electricity generated by the another generator is used as a motive power according to instructions from the controller.

8. A hybrid powered automobile according to claim 1, wherein the engine includes combustion chambers and exhaust passages for exhaust gas from the combustion chambers, and wherein each of the combustion chambers and the exhaust passages comprises a heat resisting member and a heat insulating layer on the outer side of the heat resisting member.

* * * * *